United States Patent
Hirabayashi et al.

(10) Patent No.: US 10,855,149 B2
(45) Date of Patent: Dec. 1, 2020

(54) STARTER, AND FORMATION OF GRAPHITE COVER LAYER FOR COMMUTATOR SURFACE

(71) Applicant: DENSO CORPORATION, Kariya (JP)

(72) Inventors: Takashi Hirabayashi, Kariya (JP); Taro Fukuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/361,922

(22) Filed: Mar. 22, 2019

(65) Prior Publication Data

US 2019/0305652 A1   Oct. 3, 2019

(30) Foreign Application Priority Data

Mar. 28, 2018   (JP) .................... 2018-061258

(51) Int. Cl.
- H01R 39/04 (2006.01)
- H02K 13/10 (2006.01)
- H01R 39/02 (2006.01)
- H01R 39/22 (2006.01)
- F02N 11/00 (2006.01)
- C22C 9/00 (2006.01)

(52) U.S. Cl.
CPC ........... H02K 13/105 (2013.01); F02N 11/00 (2013.01); H01R 39/025 (2013.01); H01R 39/04 (2013.01); H01R 39/22 (2013.01); C22C 9/00 (2013.01)

(58) Field of Classification Search
CPC .... H02K 13/105; H01R 39/04; H01R 39/025; H01R 39/22
See application file for complete search history.

(56) References Cited

U.S. PATENT DOCUMENTS

| | | | |
|---|---|---|---|
| 6,700,292 B2* | 3/2004 | Otani | H01R 39/20 310/233 |
| 10,199,788 B1* | 2/2019 | Argibay | H01R 39/20 |
| 2009/0214816 A1* | 8/2009 | Hata | C01B 32/162 428/114 |
| 2010/0159222 A1* | 6/2010 | Hata | B82Y 40/00 428/218 |
| 2019/0393662 A1* | 12/2019 | Hirabayashi | H01R 39/025 |

FOREIGN PATENT DOCUMENTS

| | | |
|---|---|---|
| JP | S59-185138 A | 10/1984 |
| JP | 2006-333609 A | 12/2006 |
| JP | 2006-333681 A | 12/2006 |
| JP | 2006-340431 A | 12/2006 |
| JP | 2006-348870 A | 12/2006 |
| JP | 2007-006643 A | 1/2007 |

* cited by examiner

Primary Examiner — Dang D Le
(74) Attorney, Agent, or Firm — Oliff PLC

(57) ABSTRACT

A starter includes a motor configured with a direct current motor. The direct current motor has a brush and a commutator. The brush is a sintered material formed of graphite and a copper powder. The commutator is formed of either copper or a copper alloy that has a copper content of 99% or more. A surface of is a sliding portion of the commutator which has sliding movement with the brush is provided with a graphite cover-layer that contains graphite as a main component. The graphite cover-layer contains a hard compound which has a Vickers hardness higher than 10 GPa and a metal sulfide solid lubricant.

18 Claims, 13 Drawing Sheets

STARTER, AND FORMATION OF GRAPHITE COVER LAYER FOR COMMUTATOR SURFACE

CROSS REFERENCE RELATED APPLICATION

This application is based on and claims the benefit of earlier Japanese Patent Application No. 2018-61258, filed on Mar. 28, 2018, the entire description of which is incorporated herein by reference.

BACKGROUND

Technical Field

The present disclosure relates to a starter for a starting an engine, a commutator for a motor of the starter, and formation of a graphite cover-layer on a surface of the commutator.

Related Art

Conventional starters that start an engine of vehicle by using a direct current (DC) motor equipped with a brush are known. Starters are equipped with brushes as wear items that contact a rotating commutator and conduct electric power to a winding. In particular, starters that are used for idling stop systems perform an increased number of starting operations over conventional starters which are only used for an initial starting a vehicle. Therefore, it is necessary to provide a brush that has enhanced wear resistance, for example, abrasion resistance and a service life that meet the demands of idling stop system. In addition to the brush, there is also a necessity to enhance the service life the commutator that has sliding contact with the brush.

For example, Patent Literature 1 JP 1984-185138A (JPL1) discloses a commutator that may be used for a high-speed miniature electric rotor, and a technique of forming a hard cover layer on a surface of the commutator that has sliding contact with a brush. The section of the surface of the commutator is coated, using a sputtering method or an ion plating method, with a hard cover layer that has thallium (Ti) or titanium (Ta) nitride substances, or Ti or Ta carbide substances, for example, as a main component.

JPL1 discloses the commutator that has Ti or Ta nitride or carbide, for example, as a main component in the hard cover layer. JPL1 also discloses a thickness of the hard cover layer that is formed on the surface of the commutator which in a range of 1 to 2 μm. However, since the hard cover layer of the commutator is provided with a thin cover layer, the commutator may have decreased durability, and there are issues of maintaining the hard cover layer over long periods until the end of a service life of the brush.

Furthermore, the conventional technique disclosed in the JPL1 describes that a sputtering method or an ion plating method are used as a coating method to coat the hard cover layer on the surface of the commutator. However, since such methods yield low productivity and the material cost is high, when adopting the commutator to a starter, for example, and the extreme high cost is also an issue.

In view of the above-mentioned issues, the present disclosure aims to provide a starter configured with a commutator having a surface coated with a hard cover layer that has enhanced durability. The present disclosure also provides a method to form a graphite cover-layer on the surface of the commutator with high productivity.

SUMMARY

The present disclosure is a starter used for a starting an engine. The starter includes a motor provided with a direct current motor that is equipped with a brush and commutator. The brush is formed from a sintered material that is composed of graphite and a copper powder.

The commutator is formed from copper or a copper alloy that has a content of 99% or more copper. A graphite cover-layer that has graphite as a main component is formed on the surface of the commutator. The graphite cover-layer contains a hard compound that has a Vickers hardness of more than 10 Gpa, and a metal sulfide solid lubricant.

According to the present disclosure, since the cover layer that is formed on the surface of the commutator contains graphite as the main component, the surface of the commutator has good lubrication properties. Additionally, by including hard compounds in the graphite cover-layer, a hardness of the cover layer can be enhanced, and since the metal sulfide solid lubricant is also contained on the surface of the commutator, the lubrication properties thereof are enhanced.

In this way, a graphite cover-layer that has a high level of hardness and good lubrication properties is formed on the surface of the commutator. In addition, by protecting the commutator in this way, abrasion and wearing of the commutator can be decreased and the service life may also be enhanced so that the commutator can be used for a longer period.

Additionally, since a wear resistance of the commutator is enhanced, a shape precision of the commutator due to partial wearing or abrasion of the commutator can be maintained, for example, and deterioration of a roundness of a tubular commutator or flatness of a face commutator is decreased. Furthermore, since an increase of sparks that are generated due to the deterioration of the shape precision is also suppressed a service life of the brush is also enhanced.

The hardness of the graphite cover-layer which has graphite as the main component can be enhanced by containing only a small amount of hard compounds which are costly. Therefore, enhancement of the service life of the commutator can be achieved at low cost, relative to the cover layer which has Ti or Ta nitrides or Ti or Ta carbides as the main component.

The present disclosure provides a method to form the graphite cover-layer on the surface of the commutator of the starter. The surface of the commutator is formed from either copper or the copper alloy, which has a content of 99% or more of copper, and the brush that contains the metal sulfide solid lubricant. In the present configuration, by repeatedly performing an operation of the starter, the graphite and the metal sulfide solid lubricant contained in the brush are transferred onto the surface of the commutator. The graphite and the metal sulfide solid lubricant react with heat that is generated by electricity, sliding movement of the brush with the commutator, and sparks. As a result, a graphite cover-layer is formed on the surface of the commutator, and a hard carbide compound is formed in the graphite cover-layer.

In operation durability test of the starter, it was confirmed that a cover layer that contains hard compounds was formed on the surface of the commutator after performing an operation of the starter for 2000 to 3000 times. According to the method of the present disclosure, since graphite and the metal sulfide solid lubricant are contained in the brush, a graphite cover-layer that contains the hard compound and has a high level of hardness can be formed on the surface of the commutator, without using the sputtering method or the ion plating method. As a further result, productivity of forming the cover layer on the commutator is enhanced.

Additionally, since the starter communicates a large electric current in a short period, electricity and the sparks on a sliding part of the brush, thus generate a large amount of heat. As a result, carbides that are the hard compounds are formed on the sliding part via the reaction which uses the heat. Additionally, since components such as graphite and the metal sulfide solid lubricant are contained in the brush, the graphite cover-layer that contains the hard compounds is continuously formed. As a result, the cover layer is thus maintained until the end of the service life of the brush. Furthermore, a prolonged service life of the commutator is also obtained.

EMBODIMENTS OF THE DISCLOSURE

Figure 1:
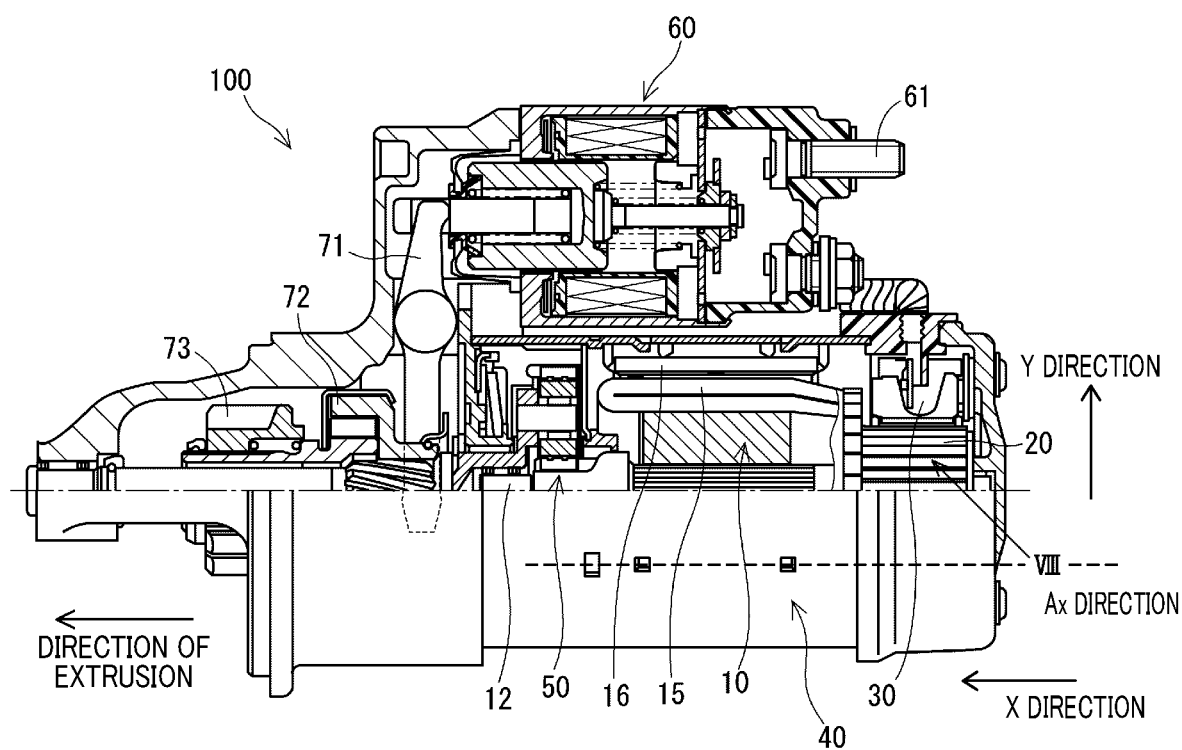
FIG. 1 shows a cross sectional diagram of an axial direction portion of a starter.

A starter according to an embodiment will be described based on drawings. The starter of the embodiment is used at a start of an engine of a vehicle, and is more particularly adopted to an idling stop system. Firstly, a total configuration of the starter will be described with reference to FIG. 1 and FIG. 2. The starter 100 is equipped with a motor 40, an inner speed reducer 50, and a switch 60, for example. A motor 40 is equipped with a DC motor that includes a brush 30 and a commutator 20 of an armature 10. The motor has an axial direction (Ax), a vertical direction (Y) that is perpendicular to the axial direction and a width direction (X) that is perpendicular to the vertical direction.

Figure 2:
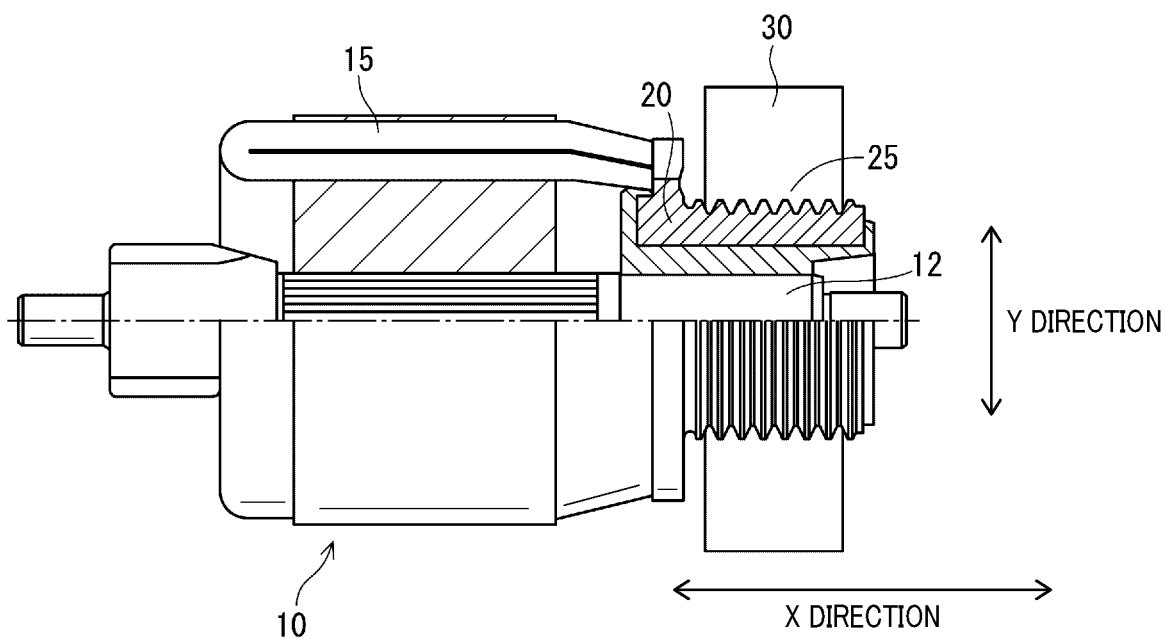
FIG. 2 is a cross sectional diagram showing an enlarged section of an armature.

As shown in FIG. 2, the armature 10 includes a coil 15 and a commutator 20, with a shaft 12 arranged in a center part thereof. A field system of the motor 40 that is shown in FIG. 1 and FIG. 2 is a magnetic field system. A magnet 16 is arranged on an inner periphery of a yoke, and a coil 15 of the armature 10 is disposed on an inner side of the magnet 16. The commutator 20 is configured to slide along a surface of the brush 30, when the commutator is rotating. In the present embodiment, the motor 40 rotates under higher speed conditions than a rotating speed of the commutator 20, which rotates at a speed of 30 m/sec, at a no load rotation period, for example.

A battery cable is connected to a battery terminal 61 of the switch 60. Once electricity is provided to a solenoid of the switch 60, a pinion gear 73 moves in an opposed which is a direction of extrusion, via a lever 71, and engages with a ring gear, which is not shown in the Figures. As shown in FIG. 1, the extrusion direction is opposed to a disposed position of the motor 40. As a consequence of the above-described operation, rotation of an output shaft of the motor 40 is transmitted to the pinion gear 72 via the speed reducer 50 and one of clutches 72.

As shown in FIG. 2, the commutator 20 is provided with a concave-convex portion 25 that is formed on a surface of the commutator 20. The concave-convex portion 25 is concave and convex formation arranged parallel to a sliding direction of the brush 30 and has sliding contact with the brush 30. The sliding direction SD is orthogonal to the width direction X of the motor 40. A detailed configuration of the concave and convex section 25 is disclosed in JP 2006-333609A, JP 2006-333681A, JP 2006-340431A, JP 2006-348870A, and JP2007-6643A, for example.

Due to construction of the concave-convex portion 25, a sliding contact state of the brush 30 is stable, and enhancement of a service life of the brush is achieved by suppression of an excess amount of sparks which are generated on a section of the surface of the brush.

Figure 3:
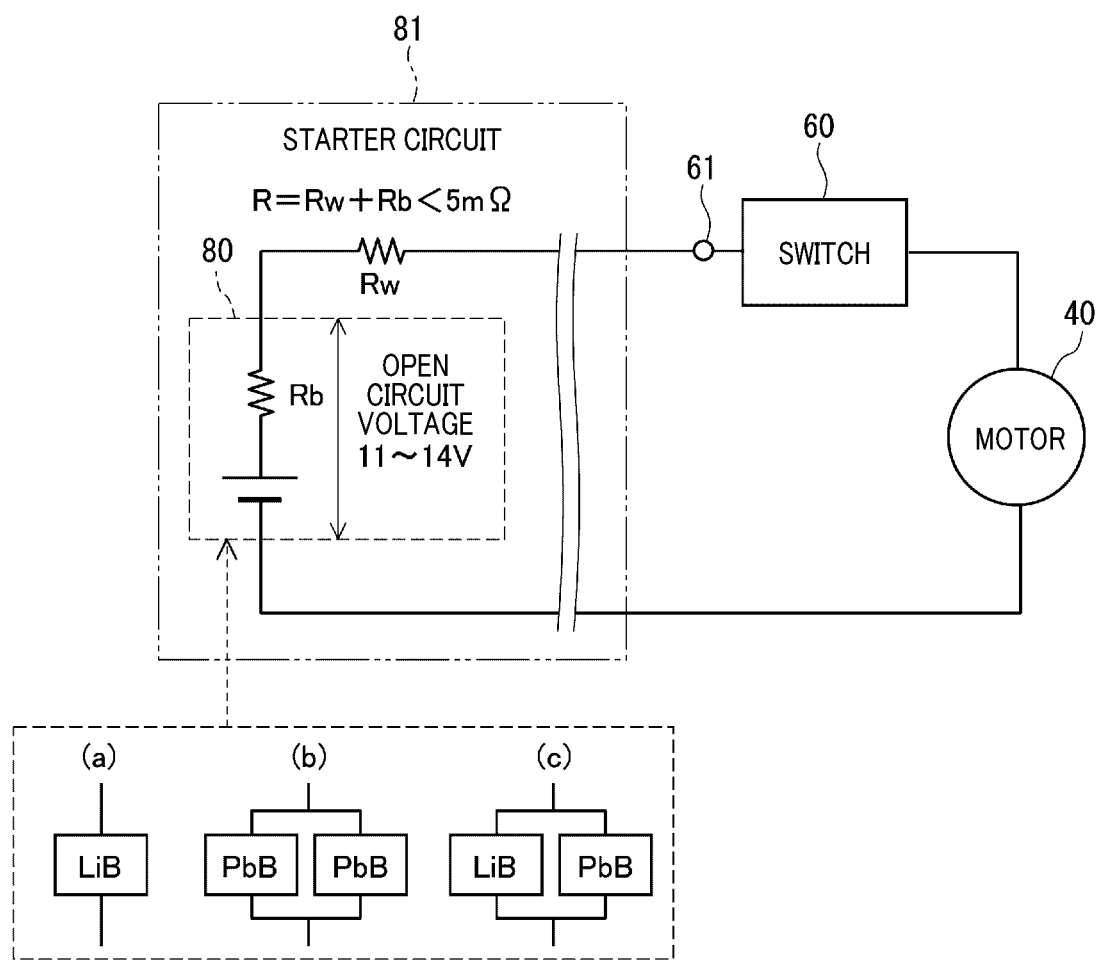
FIG. 3 is an example configuration of a starting circuit connected to a motor part.

An example of a starting circuit that is connected to the motor 40 via the switch 60 is exemplified in FIG. 3. The starting circuit 81 is configured with a battery 80 which has an open circuit voltage (OCV) in a range of 11 to 14 V, and a circuit resistance R that is less than 5 mΩ. The circuit resistance consists of wire resistance Rw and a battery inner resistance Rb. It is noted that the circuit resistance R in FIG. 3 is a model circuit. The battery 80 is configured of either one of (a) a lithium-ion battery (LiB), (b) two lead batteries (PbB) connected in parallel, or a lithium-ion battery and a lead battery connected in parallel, for example.

A conventional starter circuit configured with one lead battery having a circuit resistance between 6 to 8 mΩ is mainstream. However, recently, there are systems which use lithium-ion battery for weight reduction and charging efficiency, in which case the circuit resistance is less than 5 mΩ.

In order to increase the service life of the commutator, which has sliding contact with the brush 30 on the motor 40, the material that is formed on the surface of the commutator and major component contained in the material which is formed are decided for the embodiment. Next, the surface of the commutator 20 and material of the brush 30, in addition to the components contained, are described for each embodiment.

Components that are contained in the brush 30 at an initial stage of manufacture are different between a first and second embodiment, which is described in detail hereafter. A symbol of the starter 100 is omitted from the description hereafter.

First Embodiment

Figure 4:
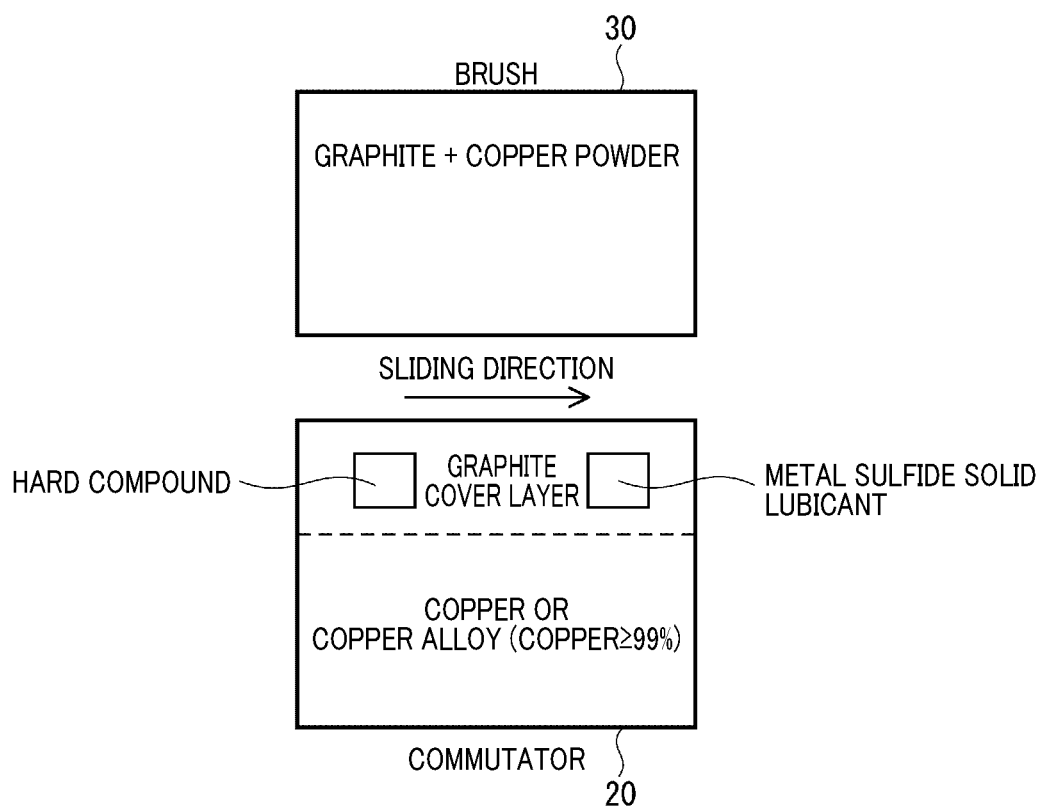
FIG. 4 is schematic drawing showing components that are contained in a commutator and brush according to a first embodiment.

The components that are contained in the commutator 20 and the brush 30 of a first embodiment are schematically shown in FIG. 4. The commutator 20 is formed of copper or a copper alloy that has a content of 99% or more copper. Copper containing silver or phosphorus dioxide copper are used as materials for the commutator 20. The brush 30 is formed from a sintered material that is made from graphite and a copper powder.

In the embodied example, the brush is a two-layer brush that consists of a low resistance layer containing a high amount of copper, and a high resistance layer containing a low amount of copper. The high amount of copper is a range of 30 to 70% mass weight of copper, and the low amount of copper is less than 40% mass weight of copper.

A graphite cover-layer 30 that has graphite as a main component is formed on the surface of the commutator 20 which is a sliding section of the brush 30. The graphite cover-layer contains the hard compound that has a Vickers hardness which is higher than 10 GPa, and metal sulfide solid lubricant. A carbide, more specifically inorganic carbon compounds are the major hard compounds which can be used. In the embodiment, hard compounds such as molybdenum carbide ($Mo_2C$) and tungsten carbide ($W_2C$), for example, can be used. The commuter 20 and the graphite cover-layer combined together may also be referred to as a commutator assembly 25.

Figure 5:
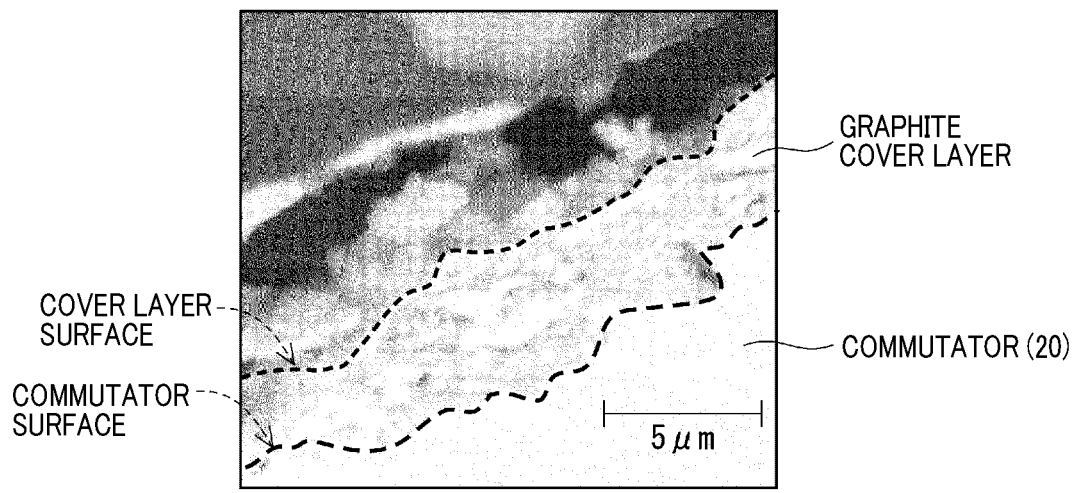
FIG. 5 is cross sectional photograph taken by Scanning Electron Microscopy (SEM) showing a surface of a cover layer on a surface of the commutator.

FIG. 5 shows a picture of the surface of the commutator 20, taken by Scanning Electron Microscopy (SEM). It is noted that the picture is shown in black and white at value of 2 without using a grey scale. In FIG. 5, the graphite layer formed on the surface of the commutator is observed.

Figure 6:
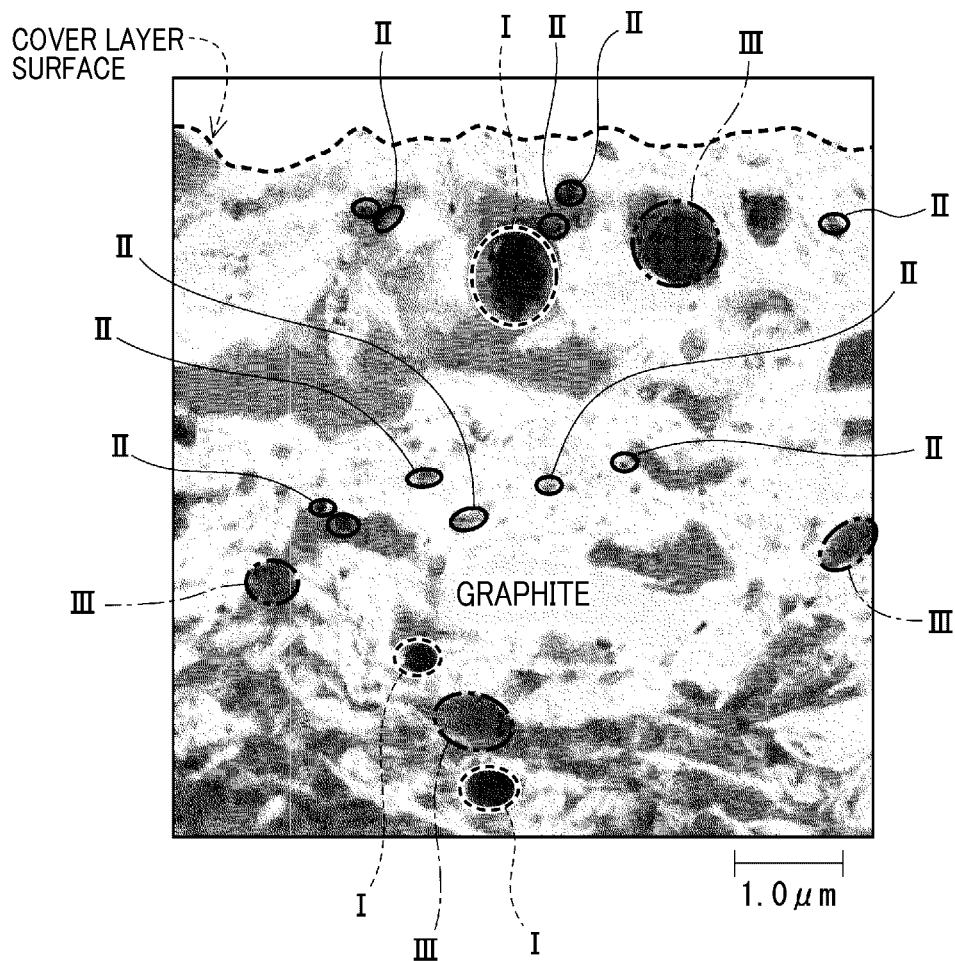
FIG. 6 is enlarged photograph taken by Transmission Electron Microscopy (TEM) showing an enlarged cross section of a surface of the cover layer.

FIG. 6 shows an enlarged picture of a cross section of the cover layer taken by Transmission Electron Microscopy (TEM). In FIG. 6, [I] represents molybdenum carbide ($Mo_2C$) and tungsten carbide ($W_2C$), [II] represents ($Mo_2S_2$) as a metal sulfide solid lubricant and ($WS_2$), and [III] represents parental material or copper particles derived from the brush.

An occupying volume percentage of the hard compound that is contained in the graphite cover-layer can be estimated based on the cross section photograph shown in FIG. 6. In the first embodiment, the volume of the hard compound contained in the graphite cover-layer, which is formed on the surface of the commutator 20, is 1% or more, relative to the volume of the graphite cover-layer. That is, the hard compound that is contained in the graphite cover-layer is provided to occupy a volume of 1% or more, relative to the volume of the graphite cover-layer.

Figure 7:
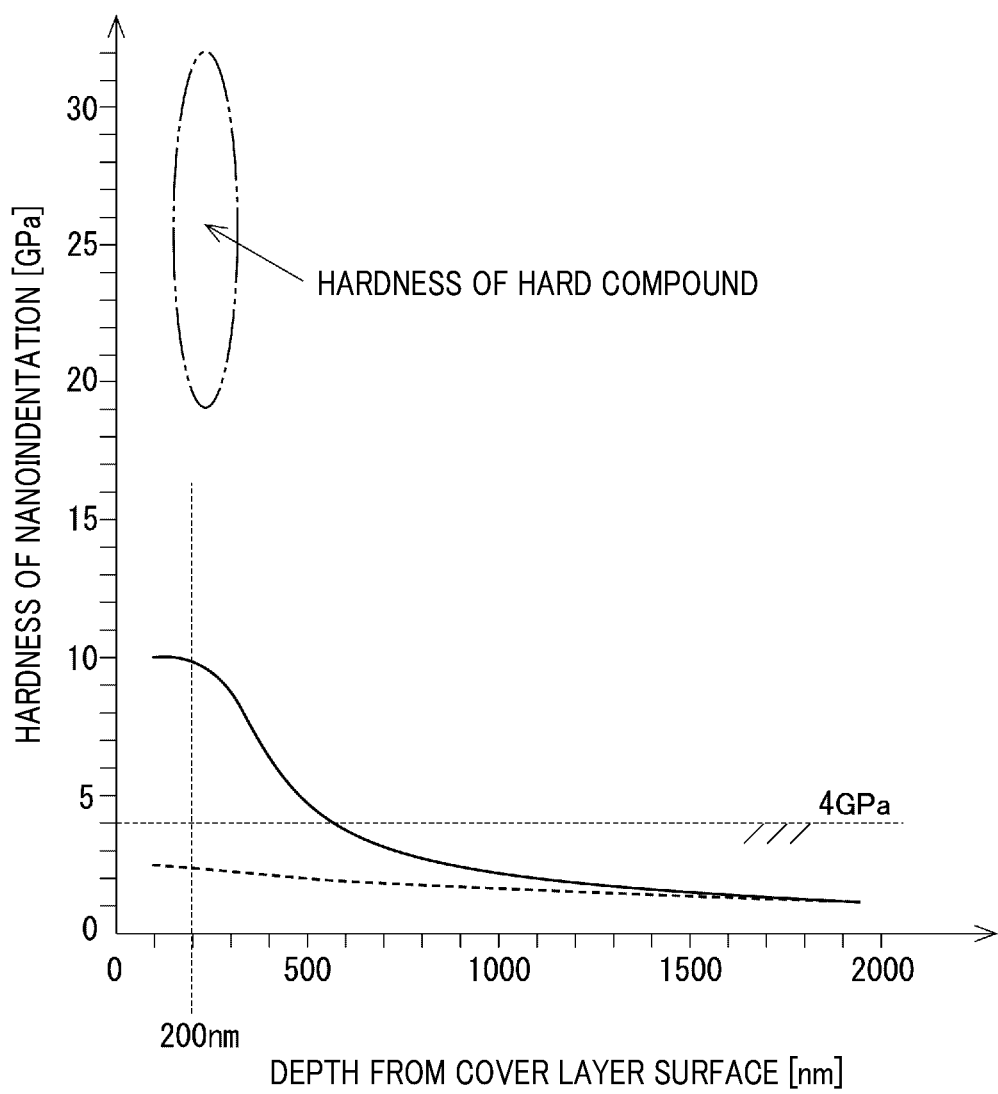
FIG. 7 is a graph showing a relation between a depth from the cover layer surface and hardness of the cover layer.

FIG. 7 is graph showing a relationship between of a depth from the surface of the cover layer and a hardness. In the graph, a solid line represents a hardness of the graphite cover-layer containing the hard compounds according to the present embodiment, and in contrast, a dash-space line represents a hardness of a graphite cover-layer not containing the hard compound as a comparative example. The hardness of the cover layer was evaluated using an MTS SYSTEMS NANO INDENTER XP device, according to a Nanoindentation Continuous Stiffness Measurement technique. A profile of a hardness depth direction was obtained by pressing with a Berkovich diamond Nano-Indenter tip on the surface of the cover layer, and a constant strain rate of $0.055^{-1}$ was maintained, and a load transition curve was analyzed when an oscillation frequency of 45 Hz was pressed in Z direction of the tip. It is noted that before the cover layer hardness evaluation was conducted, a hardness of a fused quartz was measured as a standard, and analytical result of 9.5±5% Gpa was obtained for the fused quartz standard having a depth of 100 nm or more.

As pressing into the cover layer deepens, the hardness of copper that is the parental material is detected, at this point since the hardness of the cover layer is decreased, a hardness value of a hard flat area, which was observed in a shallow area of the cover layer was taken as the cover layer hardness. An average thickness of the cover layer thickness was confirmed by observing a cross section of a reference sample, and a depth of the cover layer in which the hard flat area appears was confirmed at ⅕ of the depth, relative to the average cover layer thickness. Thus, verification of the measurement of the cover layer hardness was validated.

Figure 8:
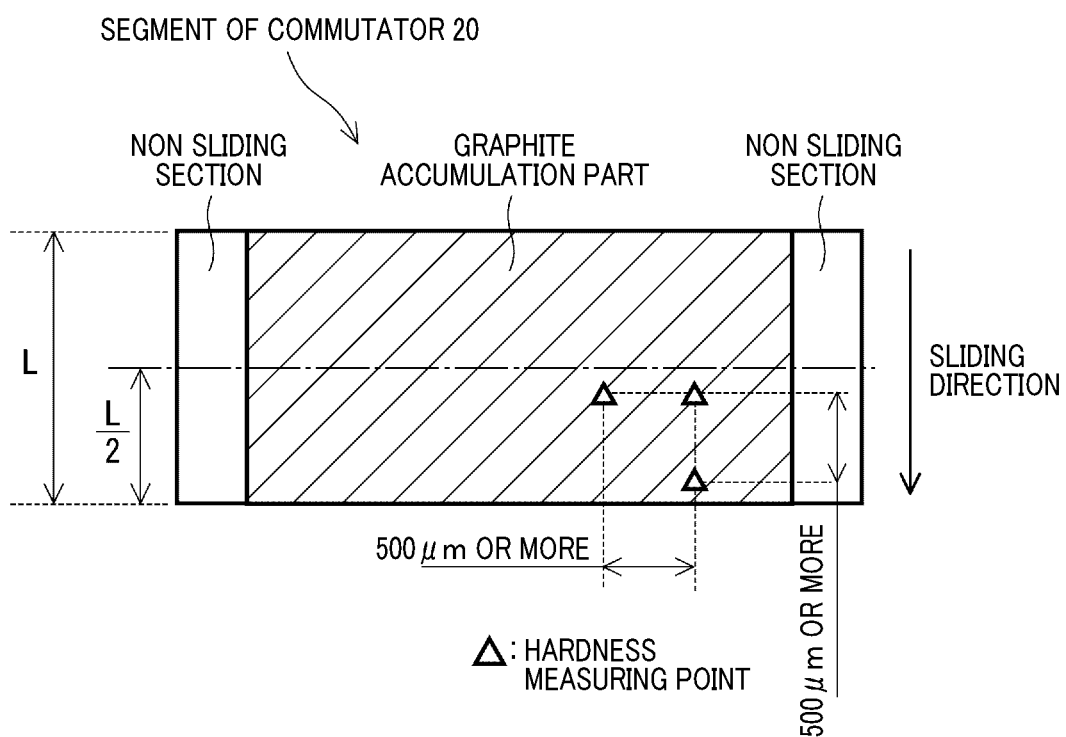
FIG. 8 is a schematic view of a segment of the commutator that is used to measure a hardness of the cover layer, relative to section VIII in FIG. 1.
Figure 9:
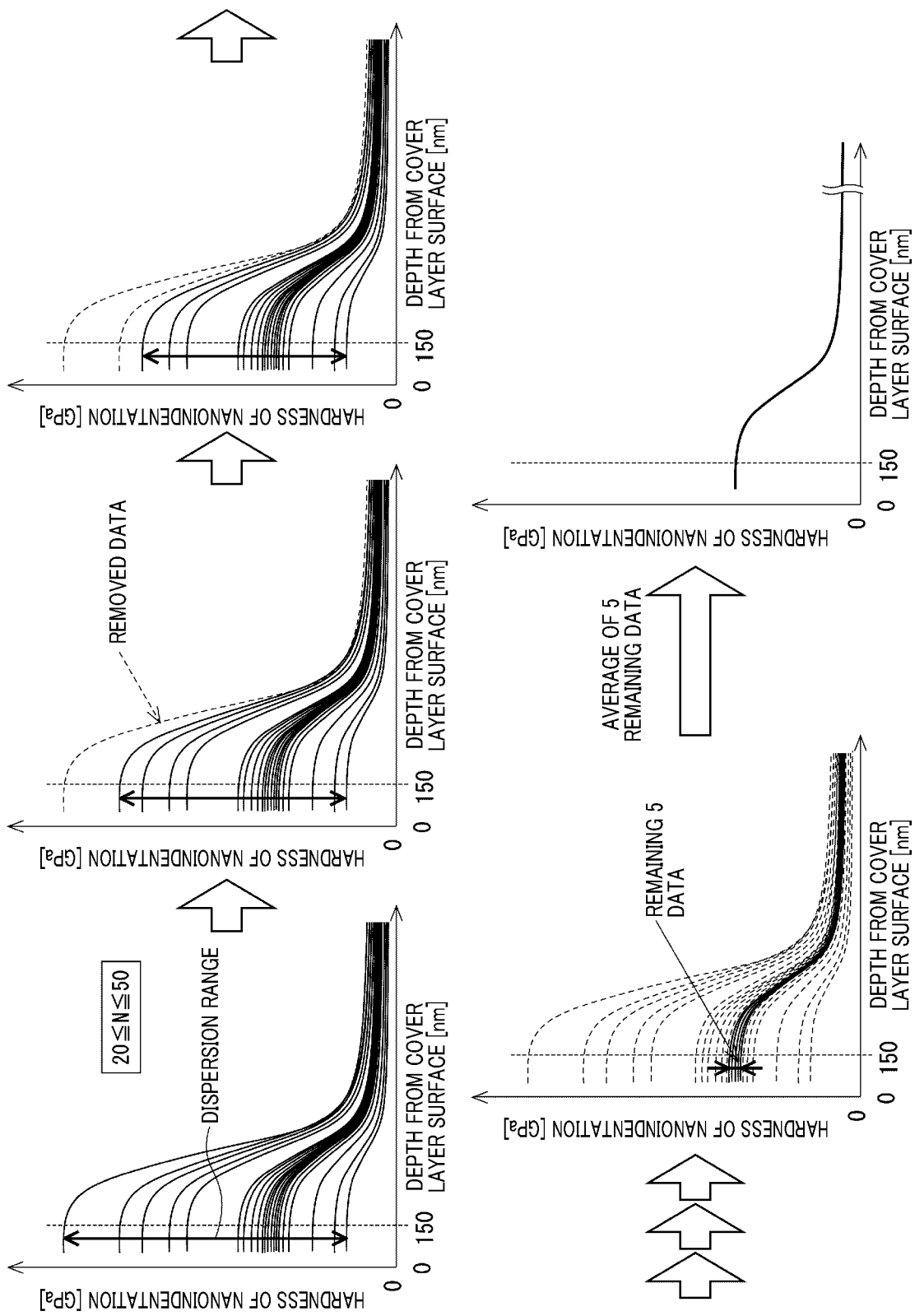
FIG. 9 is a series of graphical data explaining a measuring method of the cover layer hardness.

As shown in FIG. 8, in relation to the sliding direction of a graphite cover-layer accumulation portion of one segment of the commutator, measurement of the cover layer hardness and depth was performed for each sample at N locations (when N is given as 20≤N≤50), in a width (L/2) of a front part of thereof, at a sampling interval of 500 μm or more each sample. A total measured data for the N locations is shown in FIG. 9. From the data obtained, in order to minimize dispersion between data, at a depth of 150 nm from the surface, the dispersed data was removed so that 5 sets of data remained, and an average value for the 5 sets of data was calculated.

The hardness of the graphite cover-layer without the hard compounds contained was approximately 2 GPa at a depth of 200 nm from a surface of the cover layer, as shown in FIG. 7, and as the depth thereof increased, the hardness of the copper that is the parental material has an asymptote at approximately 1 GPa. On the other hand, the hardness of the graphite cover-layer that contains the hard compounds was approximately 10 Gpa at depth of 200 nm from the surface of the cover layer, and in the same way the hardness of the cover layer, that has an asymptote at 1 Gpa as the depth, increased. In this way, the Vickers hardness of the hard compound itself was higher than 10 GPa, that is, between 17 to 30 GPa, for example, and conversion of the Nanoindentation hardness was in a range of 19 to 32 Gpa.

Figure 10:
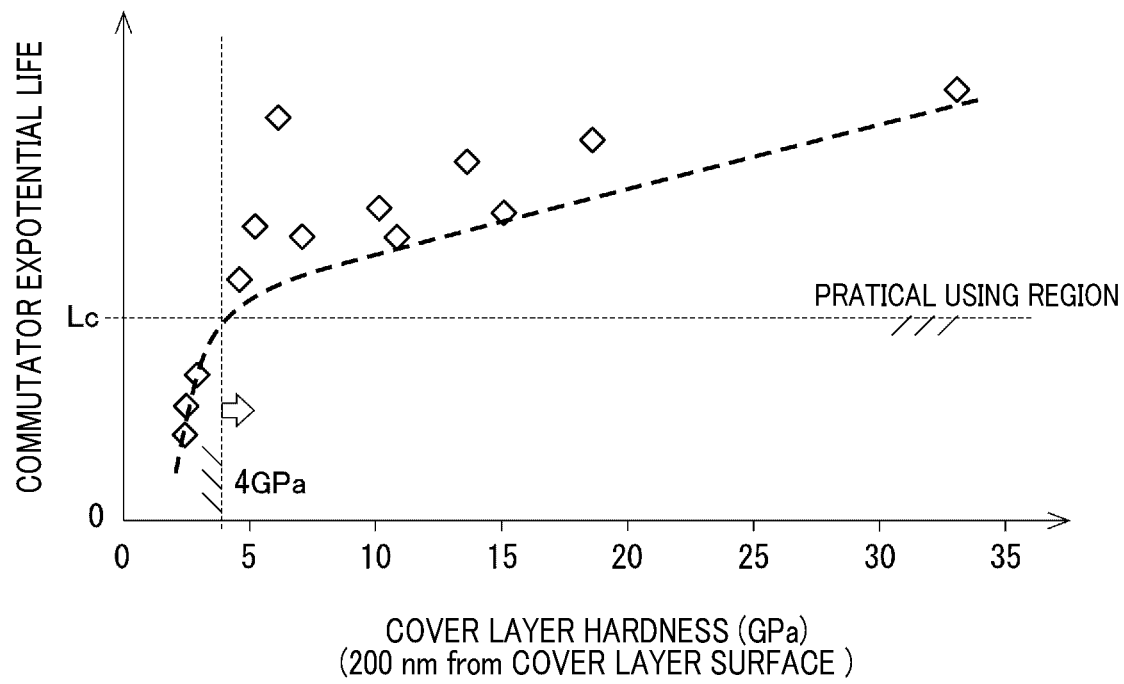
FIG. 10 is a graph showing a relation between the cover layer hardness and a commutator service life.

FIG. 10 shows a relation between the cover layer hardness and the service life of the commutator at a depth of 100 nm from the surface. A vertical axis is an exponential service life of the commutator which is equal to or higher than a practical use region Lc. A dash-space line in FIG. 10 joins a lower limit value of dispersed data that are shown. From the data shown, the higher the increase of the cover layer hardness, the longer the service life of the commutator. The cover layer hardness in regions that are higher than 4 Gpa indicated that the exponential service life of the commutator 20 was equal to or higher than Lc.

Now returning back to FIG. 7, the graphite cover-layer without the hard compound contained has a cover layer hardness that is lower than 4 Gpa, until the depth from a surface of the cover layer reached 200 nm. In contrast, the graphite cover-layer of the first embodiment that contains the hard compound has a cover layer hardness which is higher than 4 Gpa until the depth from the surface of reached 200 nm from the surface of the cover layer. Therefore conceived that the service life of the commutator 20 according to the first embodiment is enhanced.

Effects of the First Embodiment (1) The cover layer that is formed on the surface of the commutator 20 according to the first embodiment has good lubrication due to graphite which is provided as the main component. The hard compounds that are contained in the graphite cover-layer can further enhance the hardness of the cover layer, and the metal sulfide solid lubricant also contained in the cover layer provides good lubrication thereof. In this way, since the graphite cover-layer that has a high level of hardness and good lubrication is formed on the surface of the commutator, the wear resistance is increased and the service life enhanced.

Furthermore, since the wear resistance of the commutator is enhanced, the precision of the shape of the commutator due to partial wearing or abrasion of the commutator, for example, deterioration or deformation of a roundness of a tubular commutator, or a flatness of a face commutator is decreased. Furthermore, since sparks, which are generated due to the deterioration of the precision of the shape are also suppressed the service life of the brush 30 is enhanced.

A cover layer hardness of the graphite cover-layer, which has graphite as the main component, is enhanced by containing only a small quantity of the high cost hard compounds. As a result, the service life of the commutator 20 can be enhanced at low cost, in contrast to a hard cover layer that has titanium (Ti) or tantalum (Ta) nitride substances, or Ti or Ta carbide substances, for example, as a main component, disclosed in PTL 1.

(2) A DC rotor generally has a magnetic field system in which a rectification is poor compared to a field magnetic coil, thus, erosion due to sparks on the commutator are increased. The graphite cover-layer containing the hard compound of the first embodiment has a high abrasion resistance even towards the sparks generated, thus the service life of the commutator is enhanced. In this view, the field system of the motor 40 which is a magnetic field system in the first embodiment is particularly effective.

(3) The commutator 20 is provided with the sliding surface onto which the brush 30 has sliding contact. The sliding surface includes the concave-convex section 25 provided with the convex and concave formation that is parallel to the sliding direction SD of the brush 30. In this configuration, since the sliding contact state of the brush 30 is stable and generation of excess sparks are inhibited, and the surface life of the brush 30 is therefore enhanced. However, there is an issue of the concave and convex shape gradually eroding with the repeated operation of the starter, and the stable effect of the sliding contact state of the brush 30 thus decreasing as a consequence. In particular, if the commutator 20 is used in such a way that wearing of the commutator progresses, and there is a loss of the concave and convex shape on the sliding surface at an early stage of use, the stable effect of the sliding contact state of the brush is also lost at an early stage as a consequence. When rectification deteriorates at an early stage, the effect of the service life of the brush 30 also decreases as a result.

By combining the concave and convex portion 25 with the cover layer of the first embodiment, the loss of the concave and convex portion 25 is largely reduced. As a further result, the stable effect of the sliding contact state of the brush 30 can be maintained over a long period and an enhancement service life of the brush 30 can also be maintained over a long period.

(4) In particular, the starter for the idling stop system has a largely increased number of operations over the conventional starter that is only used at the initial starting an engine, therefore, it is necessary to provide a longer service life for the brush that is wear item.

At the same time, in addition to the brush, it is also necessary to enhance the service life of the commutator that has sliding contact with the brush. Therefore, adopting the starter of the first embodiment to an idling-stop system is effective.

(5) The graphite cover-layer containing hard compounds of the first embodiment has superior wear resistance, and by combining the cover layer with a high speed rotating motor, and a highly effective service life of the commutator is obtained. Furthermore, it is effective to use the commutator 20 under rotating speed conditions of 30 m/s, when the motor 40 is load rotation period.

(6) The starter in the first embodiment is provided with the starting circuit 81 that has the OCV in a range of 11 to 14V and the circuit resistance R that is less than 5 m$\Omega$, which consists of the wire resistance Rw and the battery inner resistance Rb. In systems that have a low circuit resistance, an applied voltage of the same current value is largely increased, and in turn the rotation speed of the motor is also increased and rectification thereof largely deteriorates as a result. In this case, the spark-induced abrasion on the commutator is also largely increased. However, the graphite cover-layer containing the hard compounds of the first embodiment can elicit enhanced service life effect of the commutator, even in a system that has a low circuit resistance.

Method for Forming the Graphite Cover-Layer

Figure 11:
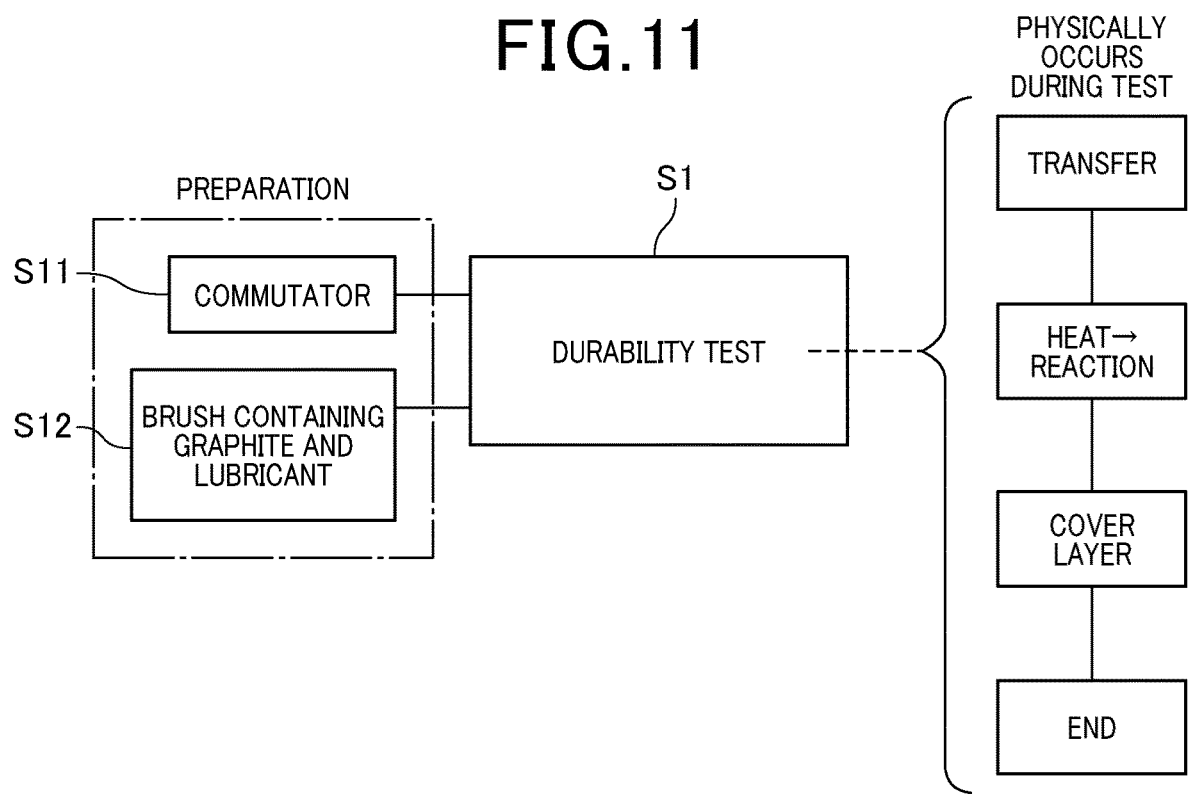
FIG. 11 shows a flow chart of a durability test whereby the cover layer is formed on a surface of the commutator, according to the first embodiment.

A method of forming the graphite cover-layer on the surface of the commutator for the starter according to the first embodiment will next be described with reference to a flowchart shown in FIG. 11. As a preparation step S12, a commuter 20 that has a surface which is made from copper or the copper alloy is prepared. The copper alloy has a copper content of 99% or more. As a second preparation step S13, a brush 30 containing the metal sulfide solid lubricant and graphite is prepared. The prepared commutator (step S12) and the brush (step S13) are subjected to the durability test (step S1). As shown in FIG. 11, in the durability test (S1), which may also be referred to the cover layer formation process is performed, and the graphite (GRAPHITE) and the metal sulfide solid lubricant (LUBRICANT) contained in the brush are transferred on to the surface of the commutator as a result of the sliding contact between the surface of the commutator 20 and the brush 30 (TRANSFER). The graphite and the metal sulfide solid lubricant reacts with heat (HEAT/REACTION), which is generated by electricity, the sliding contact and sparks. A graphite layer is formed on the surface of the commutator and carbides, which are the hard compound are formed on the graphite layer.

It is noted that the durability test mentioned here is not purely performed for the formation of the graphite layer on the surface of the commutator, however is part of a series of durability tests performed to evaluate wearing, for example, of the commutator using various parameters. In addition, formation of graphite layer may also be performed as a separate process from the durability test described.

In an operation durability test of the starter, formation of a cover layer containing the hard compound was confirmed on the surface of the commutator 20 after a starter operation was performed 2000 to 3000 times.

The hard compound, specifically carbides, are formed on the graphite layer due to a part of the graphite and the metal sulfide solid lubricant, among an entire amount of the graphite and the metal sulfide solid lubricant which are transferred onto the surface of the commutator, reacting with heat which is generated by the electricity, the sliding movement and sparks.

Figure 12:
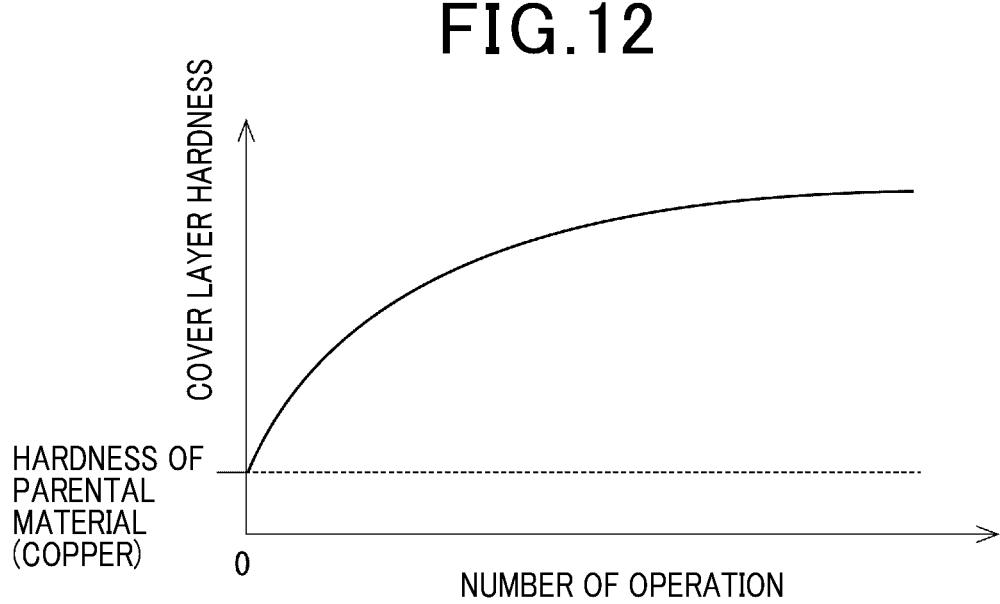
FIG. 12 is a graph showing a relation between a number of times in which an operation of the starter is performed and the cover layer hardness.

As shown in FIG. 12, it is estimated that the hardness of the cover layer is gradually increased with increased number of the starter operation.

In the embodied example, as the metal sulfide solid lubricant, disulfide molybdenum (MoS2) or disulfide tungsten (WS2) which is changed to molybdenum carbide (Mo2C) and tungsten carbide (WC) are contained in the graphite cover-layer. For example, when tungsten carbide is directly contained in the brush, the tungsten carbide works as a polishing agent, which adversely increases the wear, for example, causing erosion of the commutator. However, if the tungsten carbide is generated from the metal sulfide solid lubricant, this component incorporated into the graphite cover-layer and thus a cover layer that has a high hardness can be formed.

Since the starter communicates a large electric current in a short period of time, large amounts of heat that are generated from the electricity, in addition the sparks on a sliding portion of the brush 30 and the hard compounds, specifically, carbides are thus produced on the sliding portion of the brush. Additionally, since components such as graphite and the metal sulfide solid lubricant are contained in the brush, a graphite cover-layer that contains the hard compounds is continuously formed. The graphite cover-layer can be thus maintained until the end of the service life of the brush.

Second Embodiment

Figure 13:
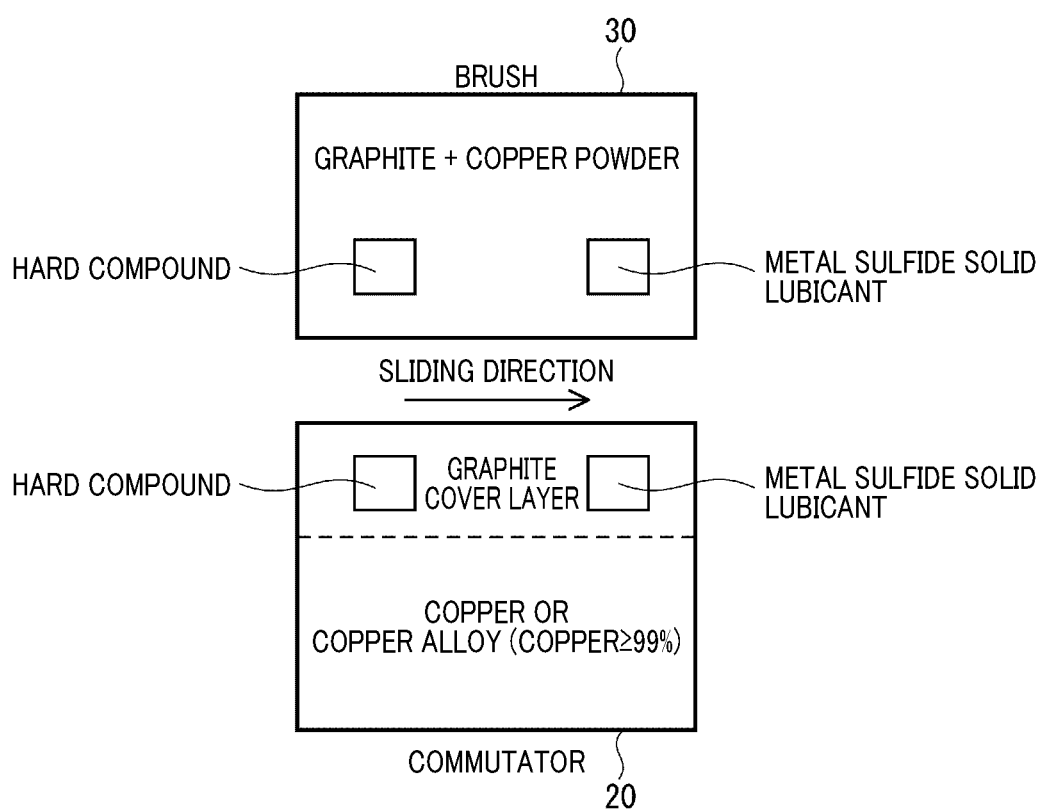
FIG. 13 is a schematic view showing the components contained on the surface of the commutator and the brush according to a second embodiment.

The second embodiment will now be described with reference to FIG. 4 of the first embodiment which corresponds to FIG. 13 of the second embodiment.

In the second embodiment, the bush 30 contains the same hard compounds and metal sulfide solid lubricant that are contained in the graphite layer that is formed on the surface of the commutator 20.

In the configuration according to the second embodiment, when the graphite cover-layer is damaged on the surface of the commutator 20 by the sparks and sliding movement, for example, graphite, the hard compounds and the metal sulfide solid lubricant are transferred onto the surface of the commutator 20. As a result, the graphite cover-layer formed on the surface of the commutator 20 is continuously repaired and can be maintained, and thus used until the end of the surface life of the brush. Furthermore, the service life of the commutator 20 is also prolonged.

Next, a method for forming the graphite cover-layer of the commutator 20 for the starter according to the second embodiment will be described. The surface of the commutator 20 is formed of copper or a copper alloy that has a copper content of 99% or more copper. The graphite, the hard compound and the metal sulfide solid lubricant contained in the brush are transferred onto the surface of the commutator. A part of the graphite and the metal sulfide solid lubricant reacts with heat which is generated by the electricity, the sliding movement and sparks, when the operation of the starter is repeatedly performed and the graphite cover-layer is thus formed on the surface of the commutator 20.

As described in the first embodiment, also in the second embodiment, a cover layer that contains hard compounds formed on the surface of the commutator 20 was confirmed after a starter operation was performed 2000 to 3000 times. The hard compounds are also formed on the graphite layer due to a part of the graphite and the metal sulfide solid lubricant reacting with heat which is generated by the electricity, the sliding movement and sparks.

In the method according to the first and the second embodiment, since there is no need to pre-coat the surface of the commutator 20, the service life of the commutator 20 can be enhanced at a low cost, compared to conventional methods such as the sputtering method and the ion plating method. Furthermore, since the graphite cover-layer containing the hard compounds is continuously produced by the components contained in the brush 30, the graphite cover-layer can be maintained until the service life of the brush and the service life of the commutator 20 can be further enhanced.

Other Embodiments

The hard compounds adopted to the configuration of the present disclosure are not limited to molybdenum carbide (Mo2C) and tungsten carbide (W2C), and other metal carbides or compounds other than carbon compounds may also be used. Also, the metal solid sulfide lubricant may be a metal sulfide other than molybdenum and tungsten. If the graphite cover-layer has a main component of graphite, then compounds other than the hard compounds and the metal sulfide solid lubricant may be used.

The hardness of the cover layer may be measured by a method other than the Nanoindentation measuring technique that employs the Continuous Stiffness Measurement mentioned earlier in the specification. That is, an alternative value that is equivalent to 4 GPa, obtained by using the Continuous Stiffness Measurement technique with Nanoindentation, may also be used be used as a minimum hardness which is required in a range from the surface of the cover layer until a 200 nm depth thereof.

The present disclosure is not limited to the embodiments described hereinabove, and includes other various modes and may be applied to DC motors used in other apparatuses and devices other than a starter without departing from the essence of the invention.

SYMBOLS

100 . . . starter, commutator . . . 20, brush . . . 30, motor . . . 40.

The invention claimed is:

1. A starter that is used for starting an engine, the starter comprising
a motor provided with a brush and a commutator, the commutator having a surface that is a sliding portion;
wherein the brush is configured of a sintered material being formed of graphite and copper powder,
the commutator is formed of either one of copper and a copper alloy having a copper content of 99% or more,
the surface of the commutator being the sliding portion that has sliding contact with the brush, has a graphite cover-layer formed thereon, and
the graphite cover-layer contains graphite as a main component, a hard compound having a Vickers hardness that is higher that 10 GPa, and a metal sulfide solid lubricant.

2. The starter according to claim 1, wherein the hard compound is carbide, and the hard compound contained in the graphite cover-layer formed on the surface of the commutator occupies a volume of 1% or more, relative to a volume of the graphite cover-layer.

3. The starter according to claim 2, wherein the graphite cover-layer has, from a surface to 200 nm depth of the graphite cover-layer, a hardness of more than 4 GPa.

4. The starter according to claim 2, wherein the motor has a field system being a magnetic field system.

5. The starter according to claim 2, wherein
the motor has an axial direction, a vertical direction that is perpendicular to the axial direction and a width direction that is perpendicular to the vertical direction;
the brush has a sliding direction that is perpendicular to the width direction of the motor, and
the commutator includes, formed on the sliding portion, a concave-convex member having a concave and convex formation that is parallel to the sliding direction of the brush.

6. The starter according to claim 2, wherein the brush contains a hard compound and metal sulfide solid lubricant being the same as the hard compound and the solid lubricant incorporated into the surface of the commutator.

7. The starter according to claim 1, wherein the graphite cover-layer has, from a surface to 200 nm depth of the graphite cover-layer, a hardness of more than 4 GPa.

8. The starter according to claim 7, wherein the motor has a field system being a magnetic field system.

9. The starter according to claim 7, wherein
the motor has an axial direction, a vertical direction that is perpendicular to the axial direction and a width direction that is perpendicular to the vertical direction;
the brush has a sliding direction that is perpendicular to the width direction of the motor, and
the commutator includes, formed on the sliding portion, a concave-convex member having a concave and convex formation that is parallel to the sliding direction of the brush.

10. The starter according to claim 7, wherein the brush contains a hard compound and metal sulfide solid lubricant being the same as the hard compound and the solid lubricant incorporated into the surface of the commutator.

11. The starter according to claim 1, wherein the motor has a field system being a magnetic field system.

12. The starter according to claim 11, wherein
the motor has an axial direction, a vertical direction that is perpendicular to the axial direction and a width direction that is perpendicular to the vertical direction;
the brush has a sliding direction that is perpendicular to the width direction of the motor, and
the commutator includes, formed on the sliding portion, a concave-convex member having a concave and convex formation that is parallel to the sliding direction of the brush.

13. The starter according to claim 11, wherein the brush contains a hard compound and metal sulfide solid lubricant being the same as the hard compound and the solid lubricant incorporated into the surface of the commutator.

14. The starter according to claim 1, wherein
the motor has an axial direction, a vertical direction that is perpendicular to the axial direction and a width direction that is perpendicular to the vertical direction;
the brush has a sliding direction that is perpendicular to the width direction of the motor, and
the commutator includes, formed on the sliding portion, a concave-convex member having a concave and convex formation that is parallel to the sliding direction of the brush.

15. The starter according to claim 14, wherein the brush contains a hard compound and metal sulfide solid lubricant being the same as the hard compound and the solid lubricant incorporated into the surface of the commutator.

16. The starter according to claim 1, wherein the brush contains a hard compound and metal sulfide solid lubricant being the same as the hard compound and the solid lubricant incorporated into the surface of the commutator.

17. A method of forming a graphite cover-layer on a surface of a commutator, comprising steps of:
preparing the commutator which has a surface being formed of either one of copper and a copper alloy having a copper content of 99% or more;
preparing a brush containing graphite and a metal sulfide solid lubricant, and
performing a cover-layer formation process, wherein
the cover-layer formation process is performed by an operation of a starter,
the graphite and the metal sulfide solid lubricant contained in the brush are transferred onto the surface of the commutator by repeated operation of the starter,
the graphite and the metal sulfide solid lubricant react with heat that is generated from electricity, sliding movement of the brush and the surface of the commutator, and sparks,
whereby a graphite layer which contains hard compounds being carbides is formed on the surface of the commutator;
the starter comprising
a motor provided with the brush and the commutator, the commutator having the surface that is a sliding portion;
wherein the brush is configured of a sintered material being formed of graphite and copper powder,
the surface of the commutator being the sliding portion that has sliding contact with the brush, is formed thereon, and
the graphite cover-layer contains the graphite as a main component, the hard compound having a Vickers hardness that is higher that 10 GPa, and the metal sulfide solid lubricant.

18. A commutator assembly comprising
a commutator having a surface being a sliding portion; and
a cover layer that is formed on the surface of the commutator, wherein
the commutator is formed of either one of copper and a copper alloy having a copper content of 99% or more,
the surface being the sliding portion of the commutator has sliding contact with a brush, containing graphite and a metal sulfide solid lubricant, and
the cover layer of the commutator is a graphite cover-layer that contains a hard compound having a Vickers hardness that is higher that 10 GPa, and a metal sulfide solid lubricant.

* * * * *